US008130987B2

(12) United States Patent
Kaneda et al.

(10) Patent No.: US 8,130,987 B2
(45) Date of Patent: Mar. 6, 2012

(54) SPEAKER SYSTEM WITH A PLURALITY OF OPENINGS IN SIDE WALLS OF EACH OF TWO SPEAKER BOXES

(75) Inventors: Hideo Kaneda, Tochigi (JP); Naotaka Kishi, Kanagawa (JP); Noboru Shiina, Saitama (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 12/395,884

(22) Filed: Mar. 2, 2009

(65) Prior Publication Data

US 2009/0257616 A1 Oct. 15, 2009

(30) Foreign Application Priority Data

Apr. 15, 2008 (JP) ................................ 2008-105497

(51) Int. Cl.
*H04R 5/02* (2006.01)
*H04R 9/06* (2006.01)
*H04R 1/02* (2006.01)
*H04B 1/00* (2006.01)

(52) U.S. Cl. ............ 381/302; 381/86; 381/87; 381/301; 381/304; 381/305; 381/333; 381/335; 381/336; 381/338; 381/386; 381/388; 381/389

(58) Field of Classification Search .................... 381/86, 381/87, 302, 304, 305, 333, 335, 336, 338, 381/386, 389, 301, 388
See application file for complete search history.

(56) References Cited

U.S. PATENT DOCUMENTS 3,384,719 A * 5/1968 Lanzara ........................ 381/301
3,512,605 A * 5/1970 McCorkle ...................... 381/301
4,027,112 A * 5/1977 Heppner et al. .............. 381/182
4,440,443 A * 4/1984 Nordskog ..................... 297/397
4,490,842 A * 12/1984 Watanabe ....................... 381/86
4,638,884 A * 1/1987 Lee ............................... 181/141
5,133,017 A * 7/1992 Cain et al. .................... 381/71.6
6,094,496 A * 7/2000 Stowers, Sr. ................. 381/362
6,234,446 B1 * 5/2001 Patterson ...................... 248/694
(Continued)

FOREIGN PATENT DOCUMENTS

JP 59-27685 2/1984
(Continued)

OTHER PUBLICATIONS

Office Action issued Jan. 27, 2011, in Japan Patent Application No. 2008-105497 (with English Translation).

(Continued)

*Primary Examiner* — Ida M Soward
(74) *Attorney, Agent, or Firm* — Oblon, Spivak, McClelland, Maier & Neustadt, L.L.P.

(57) ABSTRACT

A speaker system has a laterally extending body portion for supporting the back of the head of a user and a pair of right and left side portions respectively connected to the right and left ends of the body portion. A plurality of openings in side wall of each of two speaker boxes for making communication between the inside and the outside of each speaker box, for preventing sound leakage from each speaker unit and ensuring the sound pressure level in a low-frequency range of the audio frequencies reproducible by the speaker unit.

7 Claims, 12 Drawing Sheets

U.S. PATENT DOCUMENTS

| | | | | |
|---|---|---|---|---|
| 6,668,407 | B1 * | 12/2003 | Reitzel | 5/656 |
| 6,681,024 | B2 * | 1/2004 | Klein et al. | 381/389 |
| 6,744,898 | B1 * | 6/2004 | Hirano | 381/333 |
| 6,904,157 | B2 * | 6/2005 | Shima | 381/388 |
| 6,975,737 | B2 * | 12/2005 | Hirao | 381/302 |
| 7,077,405 | B2 * | 7/2006 | Akpom | 280/47.38 |
| 7,162,048 | B2 * | 1/2007 | Shima | 381/334 |
| D574,644 | S * | 8/2008 | Collings | D6/501 |
| 7,685,661 | B2 * | 3/2010 | Popilek et al. | 5/639 |
| RE41,384 | E * | 6/2010 | House | 381/386 |
| 2004/0016051 | A1 * | 1/2004 | Gardenier et al. | 4/541.1 |
| 2005/0190935 | A1 * | 9/2005 | Sakamoto | 381/302 |
| 2006/0285697 | A1 * | 12/2006 | Nishikawa et al. | 381/71.1 |
| 2007/0001494 | A1 * | 1/2007 | Hoover | 297/217.4 |
| 2007/0098205 | A1 * | 5/2007 | Holmi et al. | 381/388 |
| 2010/0320819 | A1 * | 12/2010 | Cohen et al. | 297/217.4 |

FOREIGN PATENT DOCUMENTS

| | | | | |
|---|---|---|---|---|
| JP | 59-69591 | U | | 5/1984 |
| JP | 61179112 | A | * | 8/1986 |
| JP | 61188243 | A | * | 8/1986 |
| JP | 61-165853 | | | 10/1986 |
| JP | 61-199275 | | | 12/1986 |
| JP | 63270260 | A | * | 11/1988 |
| JP | 02305157 | A | * | 12/1990 |
| JP | 03085096 | A | * | 4/1991 |
| JP | 3-69466 | | | 7/1991 |
| JP | 05092741 | A | * | 4/1993 |
| JP | 06282279 | A | * | 10/1994 |
| JP | 7-285392 | | | 10/1995 |
| JP | 2001095646 | A | * | 4/2001 |
| JP | 2004-172717 | | | 6/2004 |
| JP | 2005-159913 | | | 6/2005 |
| JP | 2005161898 | A | * | 6/2005 |

OTHER PUBLICATIONS

Office Action issued Jul. 15, 2010 in JP Application No. 2008-105497 (With English Translation).

* cited by examiner

SPEAKER SYSTEM WITH A PLURALITY OF OPENINGS IN SIDE WALLS OF EACH OF TWO SPEAKER BOXES

BACKGROUND OF THE INVENTION

1. Field of the Invention

The present invention relates to a speaker system.

2. Description of the Related Art

In related art, an audio system for enjoying music in the compartment of an automobile has been provided.

The audio system includes a radio tuner, tape player, CD player, etc., and audio signals output therefrom are supplied to speakers built in a front panel, doors, a rear tray, etc. in the compartment, thereby outputting sounds from these speakers.

However, the distances between the speakers and the ears of a user (driver or passenger) in each seat in the compartment are different, so that it is not easy to obtain a stereophonic feel in reproduction of sounds. Further, high-quality sounds cannot be ensured because of the road noise caused in running of the automobile.

There has been proposed a headrest with built-in speakers such that a pair of right and left speakers are built in a headrest mounted on the upper portion of each seat in the compartment (see Japanese Patent Laid-open No. 2005-159913, for example).

In this headrest, the distance between each speaker and the corresponding ear of the user can be well balanced. Accordingly, as compared with the case of using the speakers built in the front panel etc. in the compartment, the reproduction of sounds can be attained with an improvement in sound quality and stereophonic feel.

SUMMARY OF THE INVENTION

However, a part of the sounds generated from the headrest of a certain seat may leak from the right and left sides or the rear side of the headrest, so that the leaked sounds from this headrest may be heard by the other user in the adjacent seat or in the rear seat. Accordingly, such sound leakage may have an adverse effect on listening by the other user or may cause discomfort to the other user.

Further, in a frequency response of reproduced sounds, the sound pressure level in a low-frequency range tends to be lower than that in the other frequency range, and there is a limit in the improvement of sound quality.

It is accordingly desirable to provide a speaker system which can effectively prevent the sound leakage and can also improve the sound quality.

In accordance with an embodiment of the present invention, there is provided a speaker system including a laterally extending body portion for supporting the back of the head of a user; and a pair of right and left side portions respectively connected to the right and left ends of the body portion. Each of the right and left side portions includes a speaker supported to the body portion and a cover for covering the speaker. The speaker includes a speaker unit having a diaphragm and a speaker box for enclosing the speaker unit. The speaker is inclined with respect to the direction of extension of the body portion so that the center line of the speaker unit is directed toward the corresponding ear of the user in the condition where the back of the user's head is supported to the body portion. The speaker box includes a rear wall for covering the rear side of the diaphragm and a side wall projecting frontward from the periphery of the rear wall and extending along the outer edge of the diaphragm. The side wall is formed with a plurality of openings for making the communication between the inside and the outside of the speaker box, thereby preventing the sound leakage from the speaker unit and ensuring the sound pressure level in a low-frequency range of the audio frequencies reproducible by the speaker unit.

According to the above-described embodiment of the present invention, each speaker is located near the corresponding ear of the user in the condition where the back of the user's head is supported to the body portion. Further, the side wall of the speaker box is formed with the plurality of openings for making the communication between the inside and the outside of the speaker box. Accordingly, the sound leakage from each speaker can be effectively prevented and the sound pressure level in a low-frequency range can be ensured to improve the sound quality.

Other features of the invention will be more fully understood from the following detailed description and appended claims when taken with the accompanying drawings.

DETAILED DESCRIPTION OF THE PREFERRED EMBODIMENT

A preferred embodiment of the present invention will now be described with reference to the drawings. In this preferred embodiment, the present invention is applied to a driver's seat of an automobile.

Figure 1:
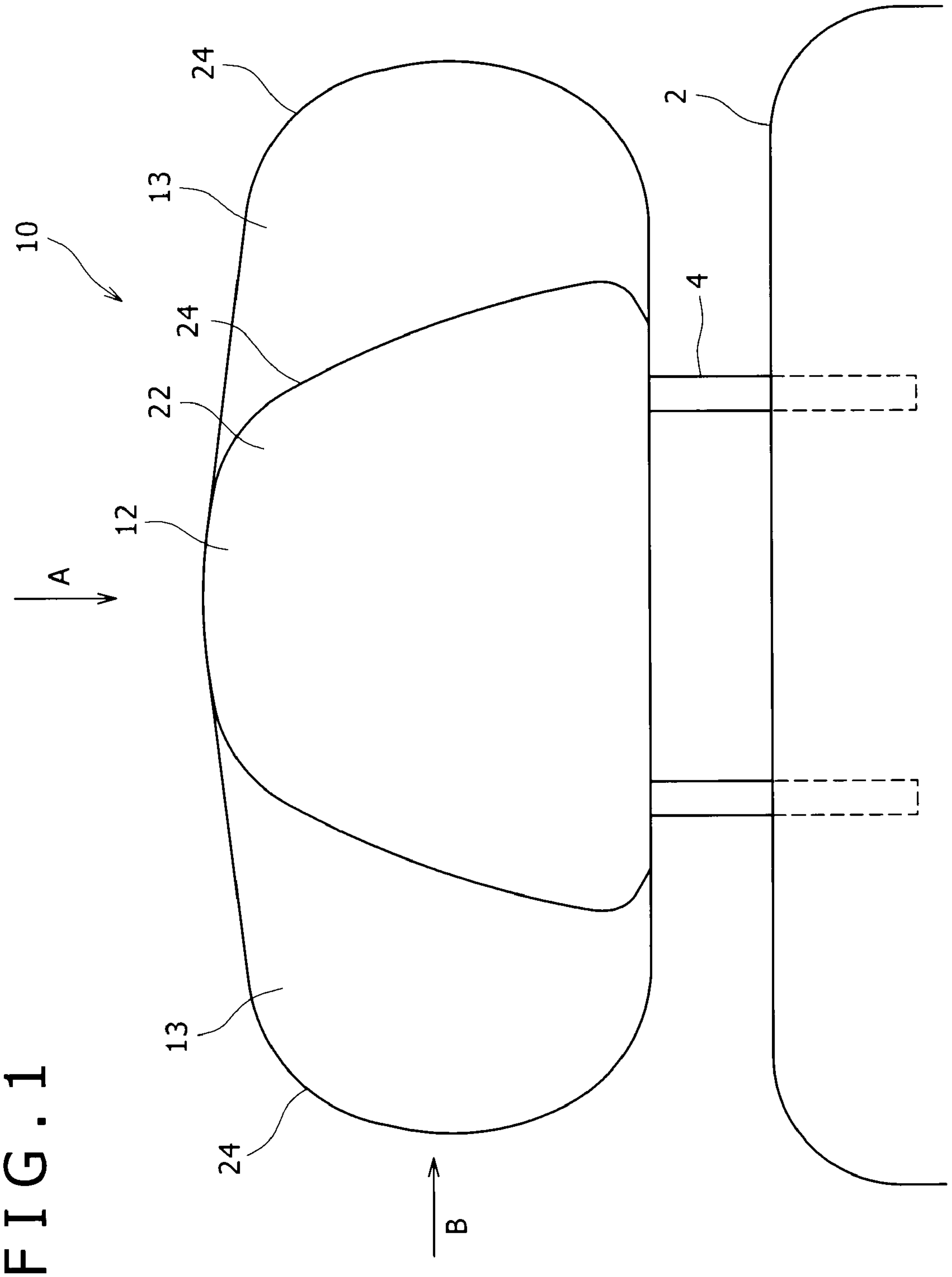
FIG. 1 is a front elevation of a speaker system according to a preferred embodiment of the present invention.
Figure 2:
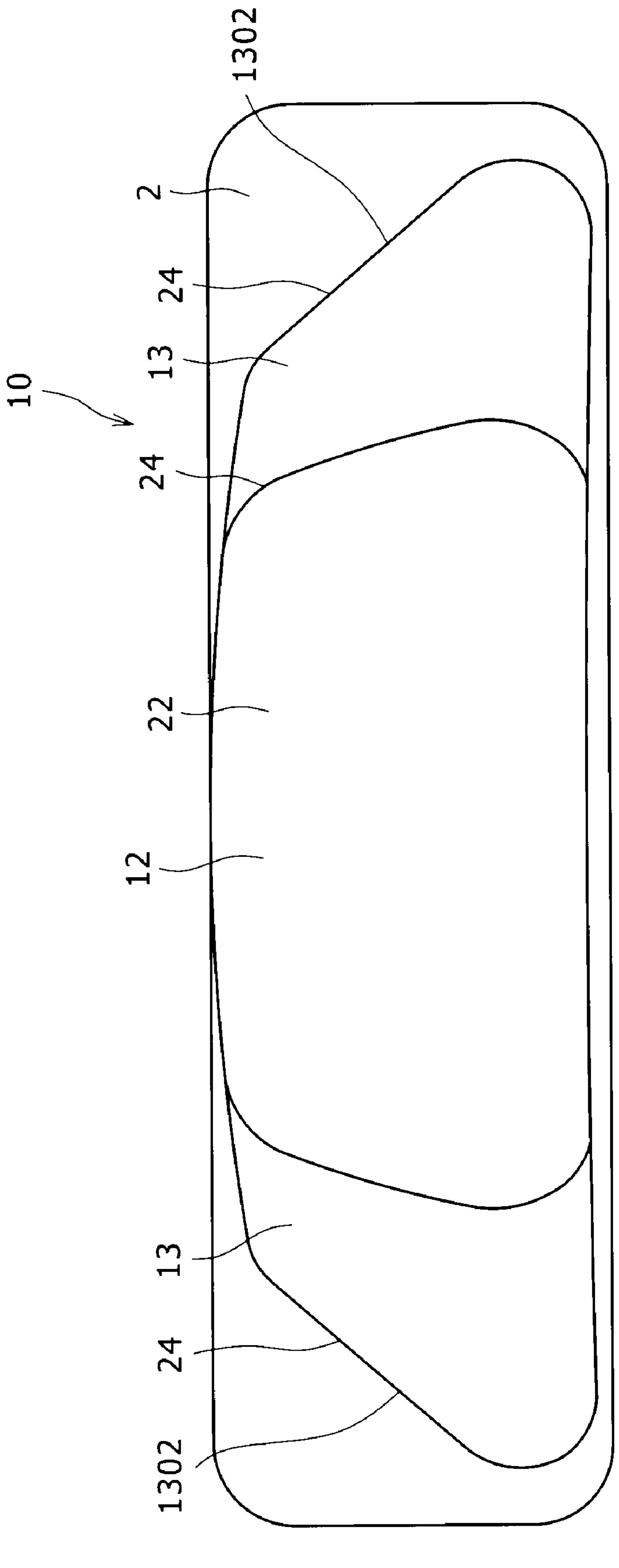
FIG. 2 is a view taken in the direction shown by an arrow A in FIG. 1.
Figure 3:
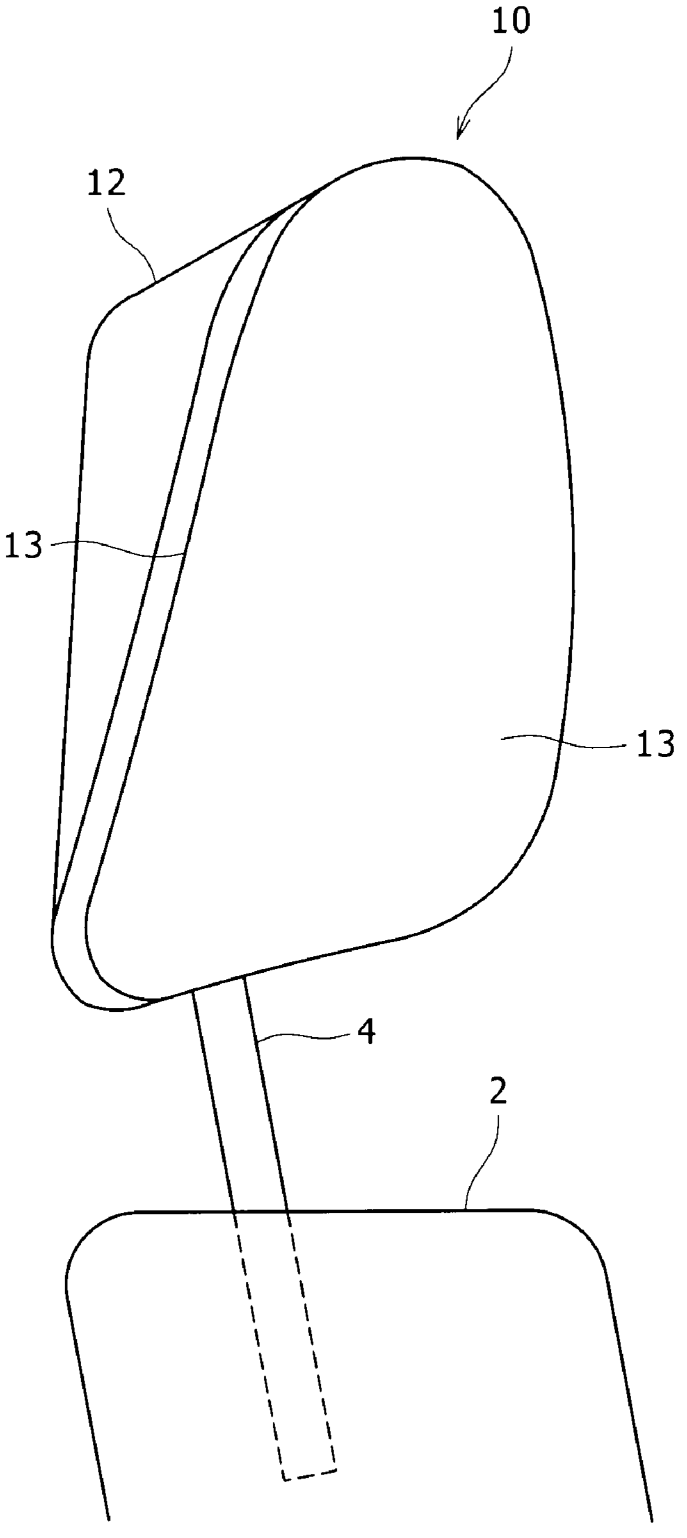
FIG. 3 is a view taken in the direction shown by an arrow B in FIG. 1.

FIG. 1 is a front elevation of a speaker system according to a preferred embodiment of the present invention, FIG. 2 is a view taken in the direction shown by an arrow A in FIG. 1, and FIG. 3 is a view taken in the direction shown by an arrow B in FIG. 1.

Figure 4:
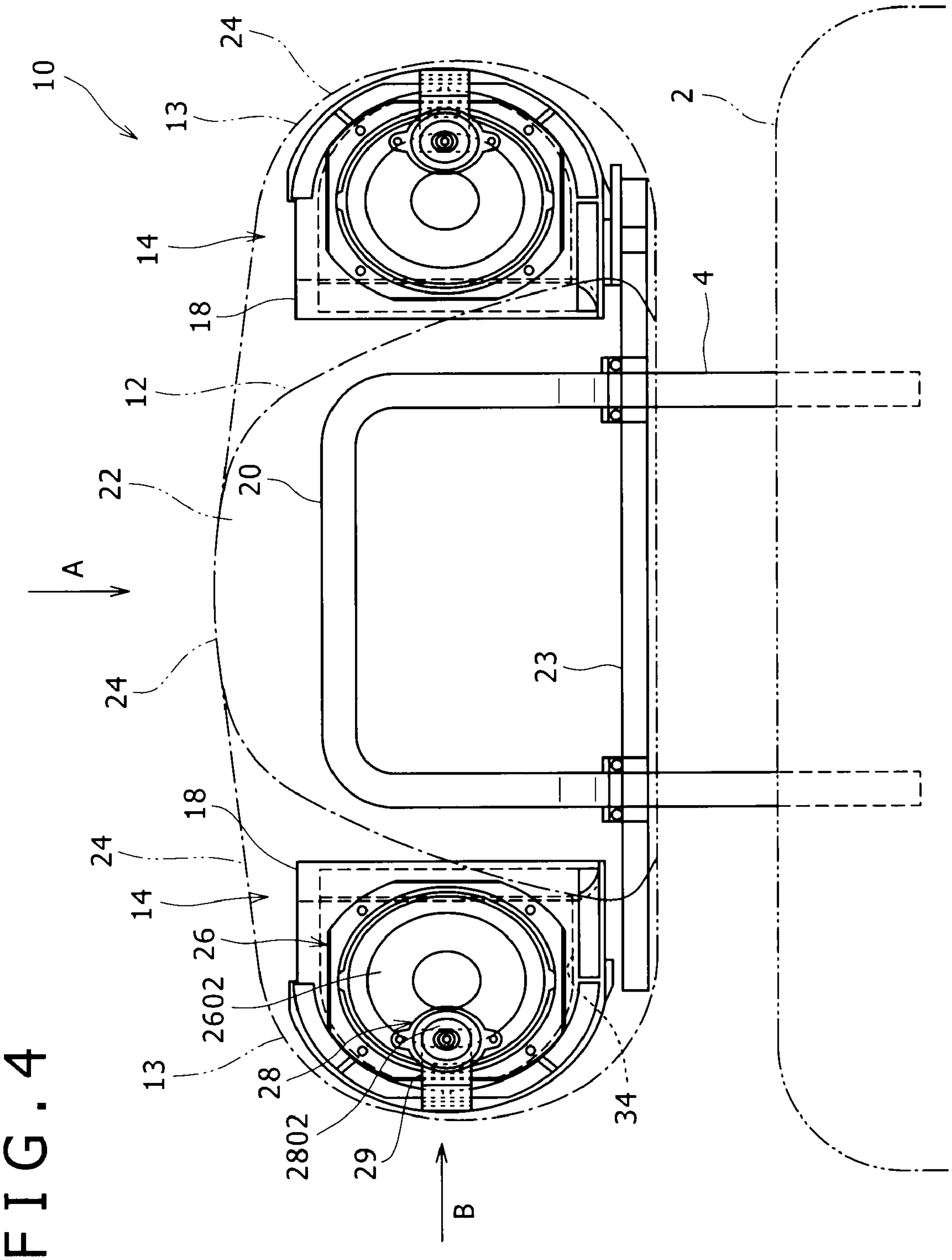
FIG. 4 is a transparent front elevation of the speaker system shown in FIG. 1.
Figure 5:
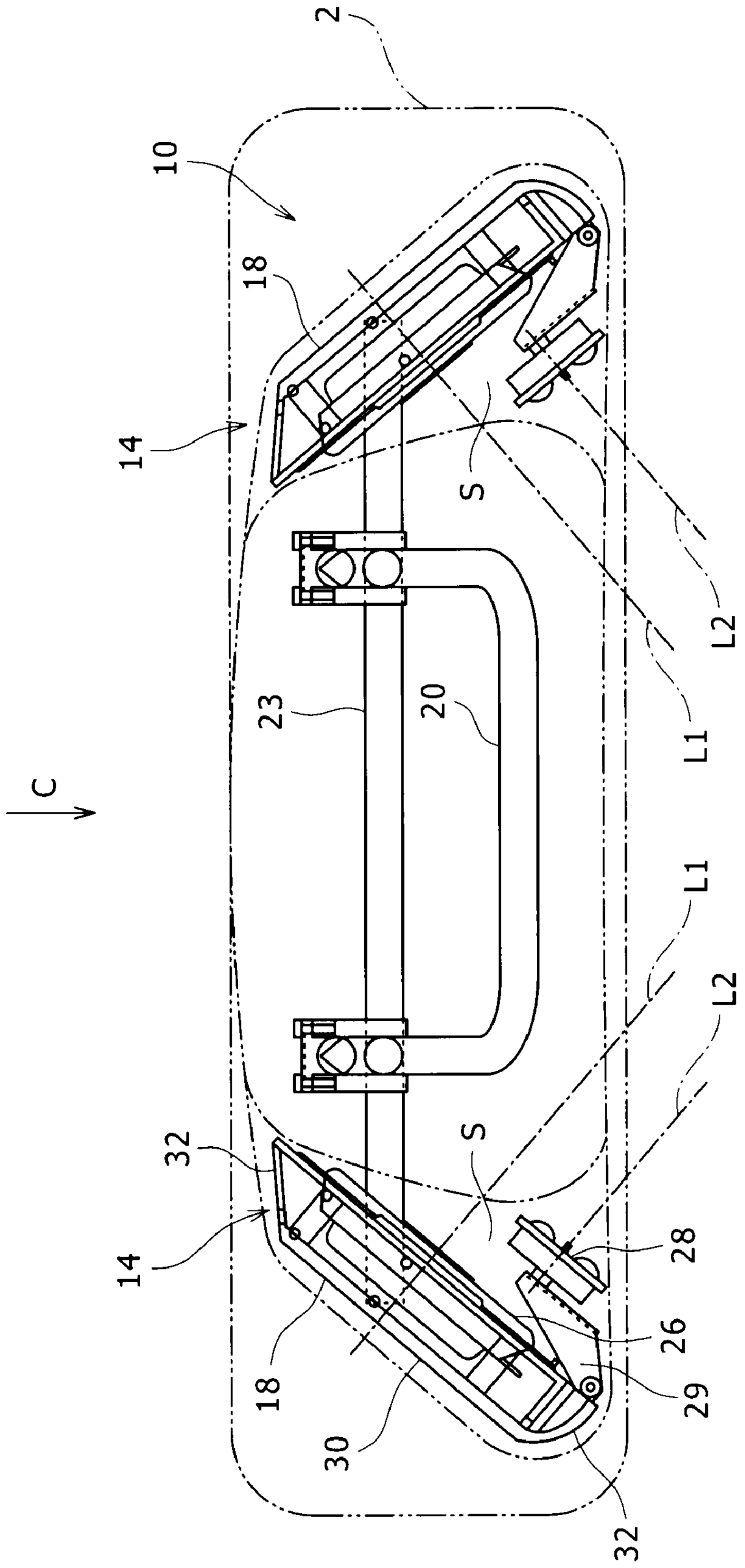
FIG. 5 is a view taken in the direction shown by an arrow A in FIG. 4.
Figure 6:
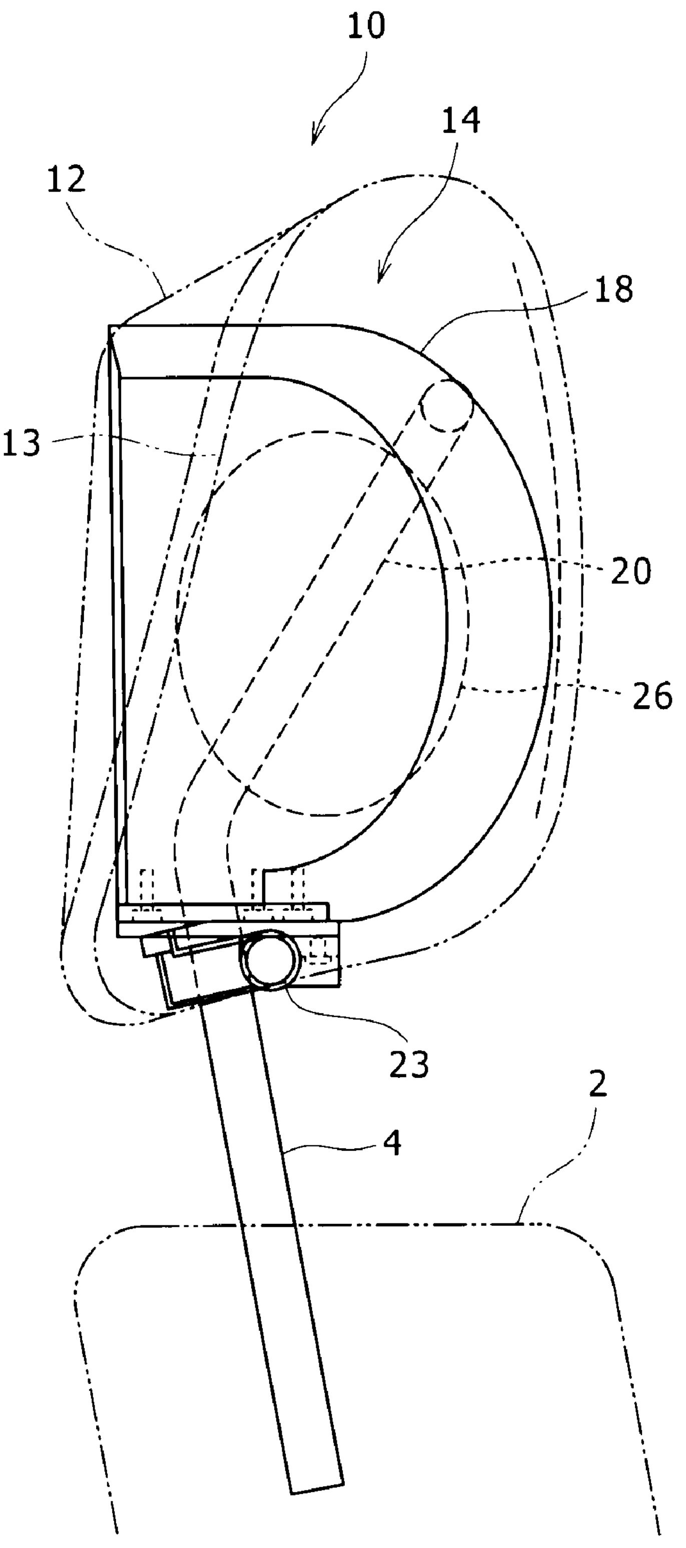
FIG. 6 is a view taken in the direction shown by an arrow B in FIG. 4.
Figure 7:
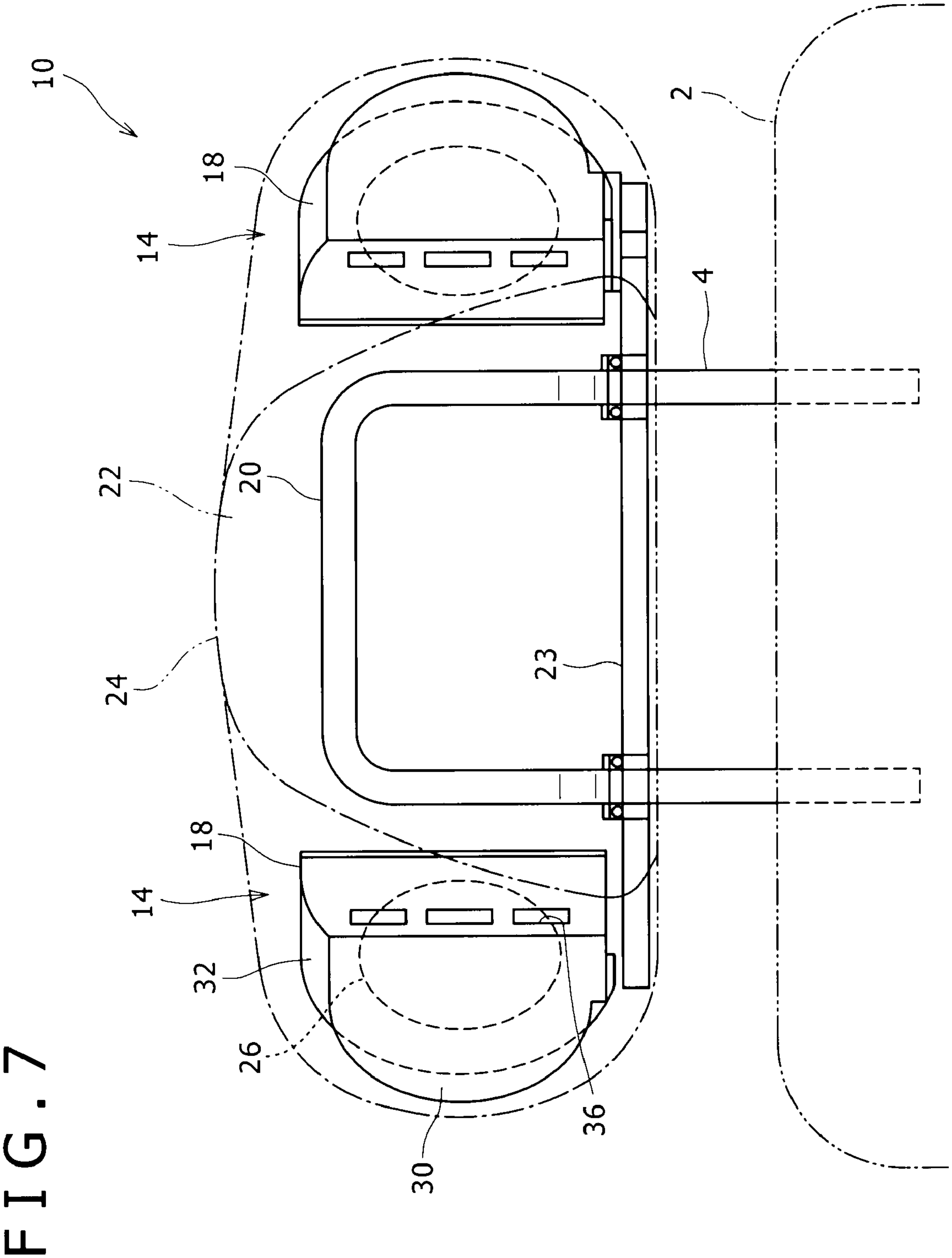
FIG. 7 is a view taken in the direction shown by an arrow C in FIG. 5.

FIG. 4 is a transparent front elevation of the speaker system shown in FIG. 1, FIG. 5 is a view taken in the direction shown by an arrow A in FIG. 4, FIG. 6 is a view taken in the direction shown by an arrow B in FIG. 4, and FIG. 7 is a view taken in the direction shown by an arrow C in FIG. 5.

Figures 8A, 8B, 8C, 8D, 8E:
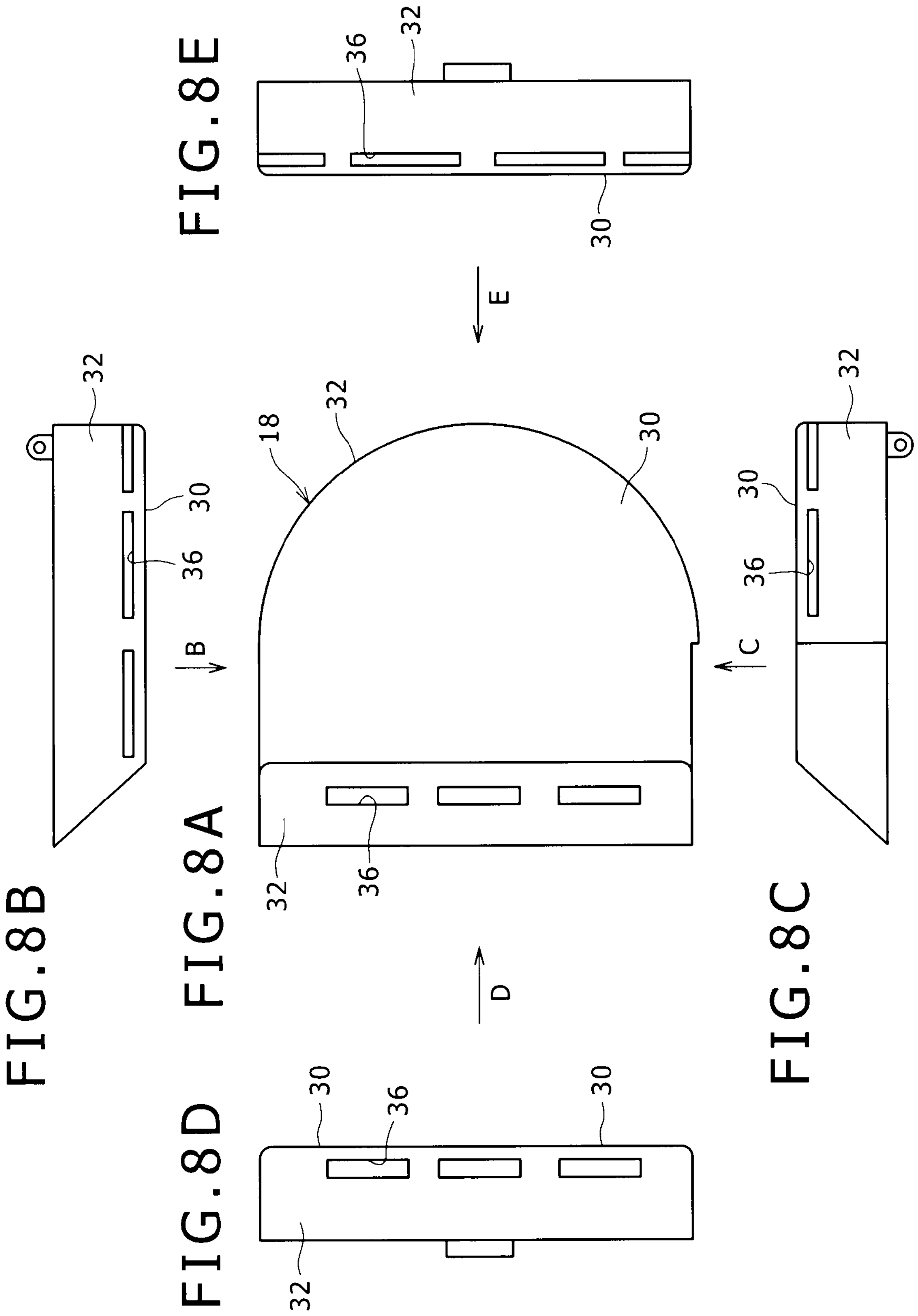
FIG. 8A is a rear elevation of a speaker box.
FIG. 8B is a view taken in the direction shown by an arrow B in FIG. 8A.
FIG. 8C is a view taken in the direction shown by an arrow C in FIG. 8A.
FIG. 8D is a view taken in the direction shown by an arrow D in FIG. 8A.
FIG. 8E is a view taken in the direction shown by an arrow E in FIG. 8A.

FIG. 8A is a rear elevation of a speaker box, FIG. 8B is a view taken in the direction shown by an arrow B in FIG. 8A, FIG. 8C is a view taken in the direction shown by an arrow C in FIG. 8A, FIG. 8D is a view taken in the direction shown by an arrow D in FIG. 8A, and FIG. 8E is a view taken in the direction shown by an arrow E in FIG. 8A.

Figure 9:
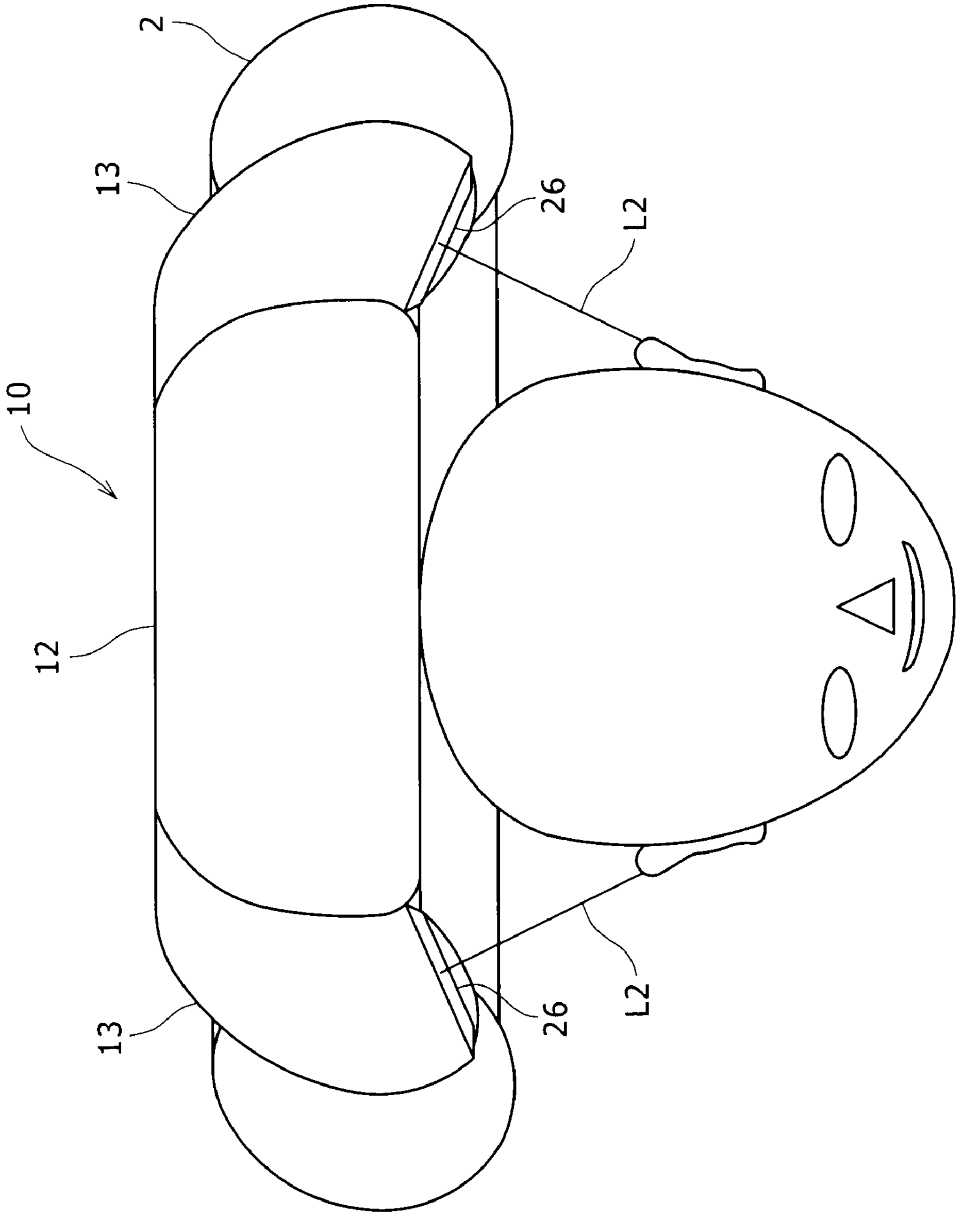
FIG. 9 is a schematic plan view showing the positional relation between a headrest and a user's head.

FIG. 9 is a schematic plan view showing the positional relation between a headrest and a user's head.

As shown in FIGS. 1 to 4, reference numeral 10 denotes a headrest including a body portion 12 and a pair of right and left side portions 13.

The speaker system according to this preferred embodiment is built in the headrest 10.

(Body Portion 12)

As shown in FIGS. 1 to 3 and 9, the body portion 12 of the headrest 10 is a portion for supporting the back of the user's head, or the back of the head of a driver in the driver's seat.

As shown in FIGS. 4 to 6, the body portion 12 includes a support rod 4, a frame 20, a pad 22, and a cover 24.

The support rod 4 is composed of an invertedly U-shaped upper portion embedded in the body portion 12 and a pair of leg portions contiguous to the lower ends of the invertedly U-shaped upper portion and projecting downward from the body portion 12.

The leg portions of the support rod 4 are detachably mounted in the upper portion of a seat back 2. In the condition where the support rod 4 is mounted in the upper portion of the seat back 2, the body portion 12 is located above the seat back 2.

The frame 20 is configured by the upper portion of the support rod 4 in this embodiment.

The pad 22 is supported to the frame 20. The pad 22 is formed of a cushion material such as foamed polyurethane.

A stay 23 is connected to the support rod 4 so as to extend laterally in the lower end portion of the body portion 12. The right and left end portions of the stay 23 project from the right and left ends of the body portion 12 into the right and left side portions 13.

The cover 24 is provided to cover the frame 20, the pad 22, and the stay 23 except its right and left ends. The cover 24 is formed of leather, cloth, etc.

Various structures known in the art are adoptable for the support rod 4, the frame 20, the pad 22, and the cover 24.

(Right and Left Side Portions 13)

As shown in FIG. 4, the right and left side portions 13 are contiguous to the right and left ends of the body portion 12, respectively.

Each side portion 13 includes a speaker 14 and a cover 24 for covering the speaker 14.

Each speaker 14 is connected to the support rod 4 or the frame 20. In this preferred embodiment, each speaker 14 is connected through the stay 23 to the support rod 4.

Accordingly, the right and left speakers 14 are located near the right and left ears of the user, respectively, in the condition where the back of the user's head is supported to the body portion 12.

The cover 24 of the body portion 12 and the cover 24 of each side portion 13 are provided by a common cover.

As shown in FIG. 2, which is a top plan view of the headrest 10, the body portion 12 and the right and left side portions 13 have the same thickness in the longitudinal direction of the vehicle and extend straight in the lateral direction of the vehicle. The rear surface of each side portion 13 is formed with an inclined surface 1302 inclined frontward on the laterally outer side.

(Speaker Unit 16)

The speaker system includes the right and left speakers 14, and each speaker 14 includes a speaker unit 16 and a speaker box 18.

As shown in FIG. 4, each speaker unit 16 includes a woofer speaker unit 26 for reproducing sounds in a low-frequency range and a tweeter speaker unit 28 for reproducing sounds in a high-frequency range.

Each woofer speaker unit 26 includes a drive unit (not shown), a diaphragm 2602, and a speaker frame 2604 for supporting the drive unit and the diaphragm 2602.

Similarly, each tweeter speaker unit 28 includes a drive unit (not shown), a diaphragm 2802, and a speaker frame 2804 for supporting the drive unit and the diaphragm 2802.

The drive units of each woofer speaker unit 26 and each tweeter speaker unit 28 function to vibrate the diaphragms 2602 and 2802 according to an audio signal supplied from an audio system (not shown).

The diaphragms 2602 and 2802 are vibrated by the respective drive units to thereby output sounds.

In this preferred embodiment, a network (filter circuit) for separating the audio signal supplied from the audio system into a low-frequency audio signal corresponding to a low-frequency range and a high-frequency audio signal corresponding to a high-frequency range and for respectively supplying the low-frequency and high-frequency audio signals to the drive units of the woofer and tweeter speaker units 26 and 28 is provided on the front stage of the drive units of the woofer and tweeter speaker units 26 and 28.

(Speaker Box 18)

As shown in FIGS. 4 to 7, each speaker box 18 functions to enclose the woofer speaker unit 26, i.e., constitutes a so-called enclosure.

As shown in FIGS. 7 and 8A to 8E, each speaker box 18 includes a rear wall 30, a side wall 32, and a front wall 34.

The rear wall 30 is so provided as to cover the rear side of the woofer speaker unit 26, and has a contour larger than that of the woofer speaker unit 26.

The side wall 32 projects frontward from the periphery of the rear wall 30 and extends along the outer edge of the woofer speaker unit 26.

The side wall 32 is formed with a plurality of openings 36 (i.e., through holes 36) for making the communication between the inside and the outside of the speaker box 18. These openings 36 are spaced along the entire circumference of the side wall 32.

Each opening 36 has an oblong shape having a width along the width of the side wall 32 and a length along the circumference of the side wall 32 larger than the width of each opening 36. That is, each opening 36 extends in the circumferential direction of the side wall 32.

For example, the width of each opening 36 is set to about 2 to 4 mm, and each opening 36 is located near the rear wall 30.

By forming the openings 36, the sound leakage from the woofer speaker unit 26 of each speaker 14 can be effectively prevented and the sound pressure level in the low-frequency range can be ensured as will be hereinafter described.

As shown in FIG. 4, the front wall 34 is connected to the front end of the side wall 32 in each speaker 14, and semicircularly extends along the outer circumference of the woofer speaker unit 26.

The front wall 34 is formed with a sound radiation opening for frontward exposing the diaphragm 2602 of the woofer speaker unit 26.

Optionally, a protective mesh for covering this sound radiation opening may be attached to the front wall 34.

(Arrangement of the Speaker Unit 16 and the Speaker Box 18)

As shown in FIGS. 4, 5, and 7, the right and left speaker boxes 18 are connected to the right and left portions of the frame 20, respectively.

The right and left woofer speaker units 26 are enclosed in the right and left speaker boxes 18, respectively. More specifically, the speaker frames 2604 of the right and left woofer speaker units 26 are mounted on the front walls 34 of the right and left speaker boxes 18 by using screws or the like to thereby fixedly enclose the right and left woofer speaker units 26 in the right and left speaker boxes 18, respectively.

As shown in FIGS. 4 and 5, the speaker frames 2804 of the right and left tweeter speaker units 28 are mounted through mounting members 29 to the right and left speaker boxes 18, respectively. Accordingly, the right and left tweeter speaker units 28 are arranged on the front side of the right and left woofer speaker units 26, respectively.

As shown in FIGS. 5 and 9, the woofer speaker unit 26 and the tweeter speaker unit 28 in each speaker 14 are inclined in such a manner that the laterally outer portions of the diaphragms 2602 and 2802 far from the body portion 12 are located on the front side of the laterally inner portions of the diaphragms 2602 and 2802 near the body portion 12, respectively, and that the center lines L1 and L2 of the woofer speaker unit 26 and the tweeter speaker unit 28 in each speaker 14 are directed toward the corresponding ear of the user in the condition where the back of the user's head is supported to the body portion 12. That is, the center lines L1 and L2 of the right woofer speaker unit 26 and the right tweeter speaker unit 28 are directed toward the corresponding ear of the user, and the center lines L1 and L2 of the left woofer speaker unit 26 and the left tweeter speaker unit 28 are directed toward the corresponding ear of the user.

As shown in FIG. 5, which is a top plan view, the contours of the right and left side portions 13 are formed inside of the contour of the seat back 2.

As shown in FIG. 6, which is a side elevation, the contours of the right and left side portions 13 are formed inside of the contour of the body portion 12.

Further, the laterally inner ends of the right and left speakers 14 near the body portion 12 are located on the rear side of the right and left ends of the body portion 12, respectively. More specifically, the laterally inner ends of the speaker boxes 18 for the right and left woofer speaker units 26 are located on the rear side of the right and left ends of the body portion 12, respectively.

As shown in FIG. 4, which is a front elevation, the laterally inner ends of the right and left speakers 14 near the body portion 12 are located inside of the contour of the body portion 12. More specifically, the laterally inner ends of the speaker boxes 18 of the right and left woofer speaker units 26 are located inside of the contour of the body portion 12.

As shown in FIG. 5, there is defined a space S between the cover 24 of each side portion 13 and the front surface of the corresponding speaker box 18. This space S may be left as it is. Alternatively, this space S may be filled with a filter capable of transmitting sounds.

The operation and effect of this preferred embodiment will now be described.

Figure 10:
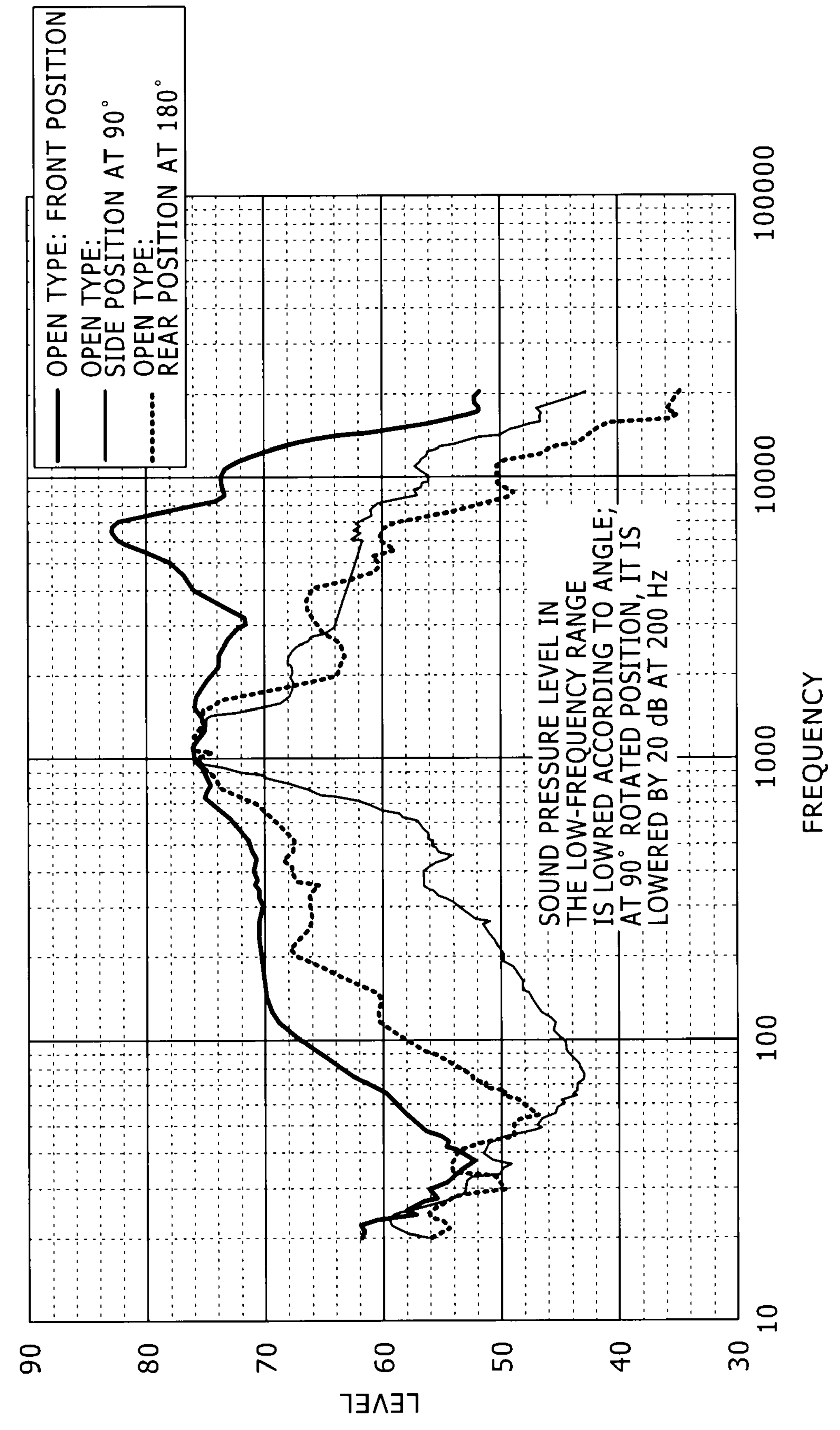
FIG. 10 is a graph showing the result of measurement of a frequency response of the speaker system according to this preferred embodiment.

FIG. 10 is a graph showing the result of measurement of a frequency response of the speaker system built in the headrest 10 according to this preferred embodiment.

The frequency response is measured at the following three different positions.

(1) Front position on the center line L2 before each woofer speaker unit 26

(2) Side position rotated at 90° with respect to the center line L2 aside each woofer speaker unit 26

(3) Rear position on the center line L2 behind each woofer speaker unit 26 (rear position at 180° with respect to the center line L2 before each woofer speaker unit 26)

These three different positions are spaced at the same distance from the center of the diaphragm 2602. This same distance is equivalent to the distance from the center of the diaphragm 2602 to the corresponding ear of the user in the condition where the back of the user's head is supported to the body portion 12 of the headrest 10. In this preferred embodiment, this same distance is set to 15 cm.

As apparent from FIG. 10, the sound pressure level in a low-frequency range less than 100 Hz at the side position is lower by about 20 dB or more than that at the front position.

Further, the sound pressure level in the low-frequency range less than 100 Hz at the rear position is lower by about 8 dB or more than that at the front position.

This effect is considered to be due to the fact that the sounds output from each woofer speaker unit 26 toward the front side of the corresponding speaker box 18 and the sounds output sideward through the openings 36 of the side wall 32 of the corresponding speaker box 18 cancel each other to thereby prevent the transmission of a part of the sounds generated from the headrest 10 to the lateral side or rear side of the headrest 10. Thus, the sound leakage from each woofer speaker unit 26 can be prevented.

Each tweeter speaker unit 28 reproduces higher audio frequencies and therefore has a narrow directivity. Accordingly, the sound leakage from each tweeter speaker unit 28 is negligible.

Further, as shown in FIG. 10, the sound pressure level at the front position is substantially flat in the range of 100 to 500 Hz, so that the sound pressure level in the low-frequency range can be sufficiently ensured.

That is, by forming the openings 36 through the side wall 32 of the speaker box 18, the sound pressure level in the low-frequency range can be ensured and it is advantageous in reproducing sounds in the low-frequency range.

Figure 11:
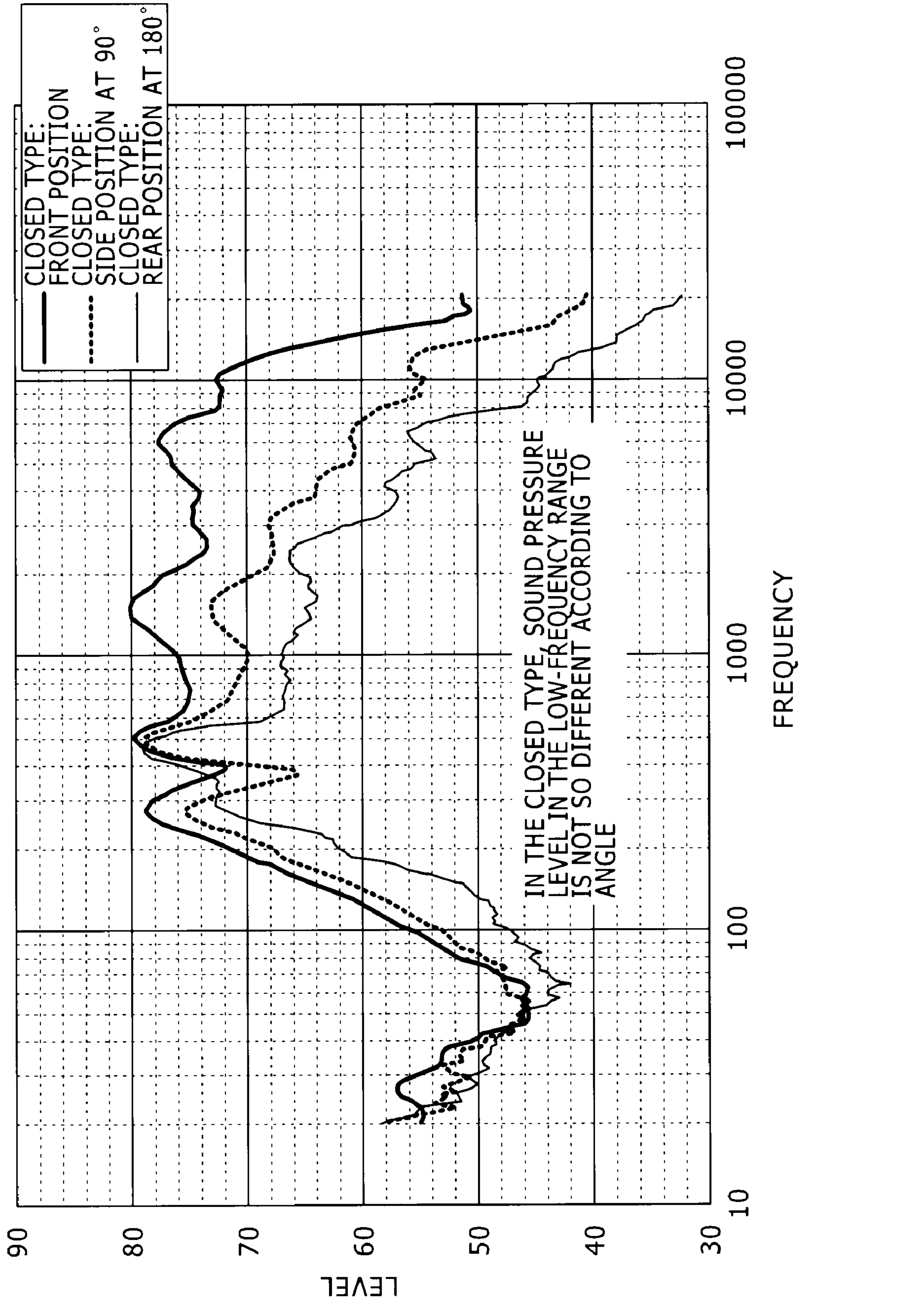
FIG. 11 is a graph showing the result of measurement of a frequency response of a speaker system as a comparison.

FIG. 11 is a graph showing the result of measurement of a frequency response of a speaker system as a comparison.

This speaker system as a comparison is different from the speaker system built in the headrest 10 according to this preferred embodiment in only that the openings 36 are not formed in the speaker box 18.

As similar to the case shown in FIG. 10, the frequency response is measured at the three different positions.

As apparent from FIG. 11, the sound pressure level in the low-frequency range less than 100 Hz at the side position is lower by only about 2 dB than that at the front position. Further, the sound pressure level in the low-frequency range less than 100 Hz at the rear position is lower by about 8 dB than that at the front position.

Accordingly, the sound pressure level at the side position is not so different from the sound pressure level at the front position, so that the sound leakage from each woofer speaker unit 26 is remarkable.

Figure 12:
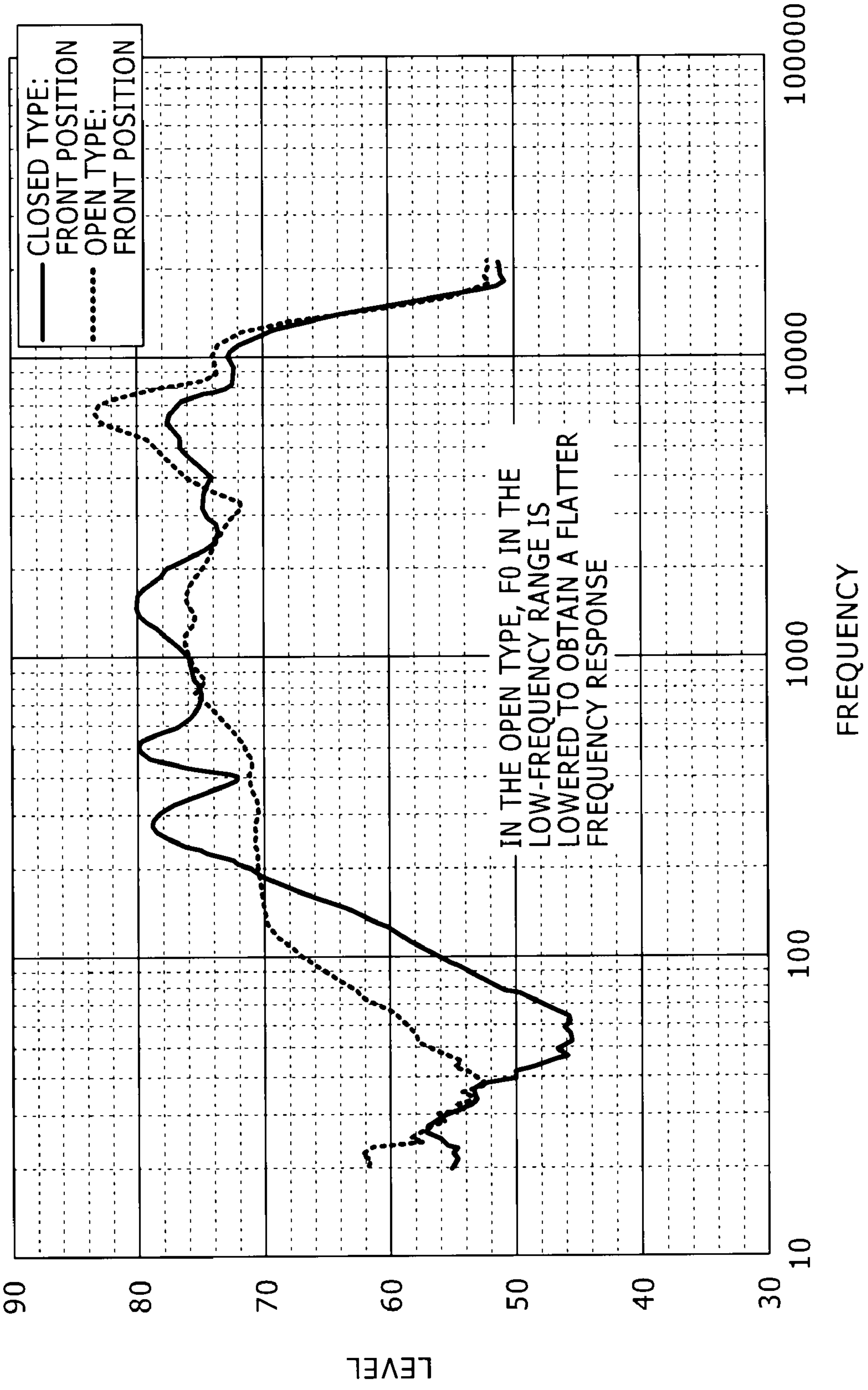
FIG. 12 is a graph showing the result of measurement of a frequency response at the front position in the speaker system according to this preferred embodiment and at the front position in the speaker system as the comparison.

FIG. 12 is a graph showing the result of measurement of a frequency response at the front position in the speaker system according to this preferred embodiment (open type) and at the front position in the speaker system as the comparison mentioned above (closed type).

As shown in FIG. 12, in the comparison, the sound pressure level in the low-frequency range less than 200 Hz is remarkably lower than that in the high-frequency range greater than 200 Hz. The sound pressure level in this low-frequency range in the comparison is lower than that according to this preferred embodiment.

More specifically, the sound pressure level in the range of 50 to 100 Hz in the comparison is lower by 8 dB than that according to this preferred embodiment.

In the speaker system according to this preferred embodiment, the lowest resonance frequency f0 of each speaker 14 can be made lower than that of each speaker in the comparison. Accordingly, a flatter frequency response can be realized according to this preferred embodiment and it is advantageous in improving the quality of sounds output from each speaker 14.

As described above, according to this preferred embodiment, each speaker 14 is located near the corresponding ear of the user in the condition where the back of the user's head is supported to the body portion 12, and the side wall 32 of the speaker box 18 in each speaker 14 is formed with the plural openings 36 for making the communication between the inside and the outside of the speaker box 18. Accordingly, the sound leakage from each speaker 14 can be effectively prevented and the sound level in the low-frequency range can be ensured to thereby improve the sound quality.

Further, the sound leakage can be prevented by a simple configuration such that the plural openings 36 are formed through the side wall 32 of the speaker box 18 in each speaker 14. Accordingly, it is unnecessary to provide any dedicated sound leakage preventing member, so that each speaker 14 can be reduced in size and thickness at a low cost.

Further, the contours of the right and left side portions 13 are formed inside of the contour of the seat back 2 as viewed in plan, and the contours of the right and left side portions 13 are formed inside of the body portion 12 as viewed in side elevation. Further, the laterally inner ends of the right and left speakers 14 near the body portion 12 are located on the rear side of the right and left ends of the body portion 12, respectively.

Accordingly, in the case that the user in the driver's seat of an automobile uses a seat belt, there is no possibility that the right and left side portions 13 may interfere with the seat belt. Further, in the case that the user in the driver's seat views the back side of the vehicle, the influence of the right and left side portions 13 upon the viewability can be minimized. Thus, various burdens on the user can be reduced to improve the usability.

While the speaker system according to an embodiment of the present invention is applied to the headrest of the driver's seat of an automobile in this preferred embodiment, the present invention is widely applicable to the headrests of any seats other than the driver's seat, e.g., the headrests of the seats of various vehicles such as a train, airplane, and ship and the headrests of a sofa, chair, etc.

The present application contains subject matter related to that disclosed in Japanese Priority Patent Application JP 2008-105497 filed in the Japan Patent Office on Apr. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A speaker system comprising:

a laterally extending body portion for supporting a back of the head of a user;

a pair of right and left side portions respectively connected to right and left ends of said body portion;

speakers supported to said body portion of each of said right and left side portions and a cover for covering said speakers;

a speaker unit having a diaphragm and a speaker box for enclosing said speaker unit mounted in each of said speakers;

connections of said right and left side portions of said speakers being inclined with respect to a direction of extension of said body portion so that the center line of said speaker unit is directed toward a corresponding ear of said user in a condition where said back of said user's head is supported to said body portion;

a rear wall of each of said speaker boxes covering the rear side of said diaphragm and a side wall projecting frontward from the periphery of said rear wall and extending along the outer edge of said diaphragm; and a plurality of openings in said side wall of each said speaker box for making communication between an inside and outside of said speaker box, for preventing sound leakage from said speaker unit and ensuring sound pressure level in a low-frequency range of audio frequencies reproducible by said speaker unit.

2. The speaker system according to claim 1, wherein, said body portion is located above a seat back, and said body portion and said right and left side portions constitute a headrest.

3. The speaker system according to claim 1, wherein said plurality of openings are spaced along an entire circumference of said side wall.

4. The speaker system according to claim 2, wherein, said body portion includes a support rod detachably mounted to said seat back, a frame connected to said support rod, a pad attached to said frame, and a cover for covering said frame and said pad, said speaker is connected to said support rod or said frame, and said cover of said body portion and said cover of each side portion are provided by a common cover.

5. The speaker system according to claim 2, wherein, said body portion includes a support rod detachably mounted to said seat back, a frame connected to said support rod, a pad attached to said frame, and a cover for covering said frame and said pad, said speaker is connected to said support rod or said frame, said cover of said body portion and said cover of each side portion are provided by a common cover, and said body portion and said right and left side portions extend straight in the lateral direction as viewed in plan.

6. The speaker system according to claim 1, wherein said speaker unit includes a woofer speaker unit and a tweeter speaker unit, wherein said tweeter speaker unit being located on the front side of the laterally outer end of a speaker box for enclosing said woofer speaker unit far from said body portion and is inclined with respect to the direction of extension of said body portion so that the center line of said tweeter speaker unit is directed toward the corresponding ear of said user in the condition where said back of said user's head is supported to said body portion.

7. The speaker system according to claim 2, wherein said seat back constitutes a seat in a vehicle.

* * * * *